US012455526B2

(12) United States Patent
Okada et al.

(10) Patent No.: US 12,455,526 B2
(45) Date of Patent: Oct. 28, 2025

(54) IMAGE FORMING APPARATUS

(71) Applicant: KYOCERA Document Solutions Inc., Osaka (JP)

(72) Inventors: Masataka Okada, Osaka (JP); Masaki Kadota, Osaka (JP); Yuji Kamiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/737,089

(22) Filed: Jun. 7, 2024

(65) Prior Publication Data

US 2024/0419110 A1 Dec. 19, 2024

(30) Foreign Application Priority Data

Jun. 14, 2023 (JP) ................................ 2023-097852

(51) Int. Cl.
*G03G 15/00* (2006.01)
*G03G 15/043* (2006.01)

(52) U.S. Cl.
CPC ....... *G03G 15/5041* (2013.01); *G03G 15/043* (2013.01)

(58) Field of Classification Search
CPC ........... G03G 15/0266; G03G 15/0275; G03G 15/5033; G03G 15/5037; G03G 15/5041; G03G 15/55
See application file for complete search history.

(56) References Cited

U.S. PATENT DOCUMENTS

| | | | | |
|---|---|---|---|---|
| 2007/0092296 | A1* | 4/2007 | Ishino | G03G 5/061473 399/175 |
| 2017/0097585 | A1* | 4/2017 | Kihara | G03G 15/0275 |
| 2017/0242383 | A1* | 8/2017 | Akashi | G03G 15/55 |
| 2018/0074428 | A1* | 3/2018 | Furukawa | G03G 15/553 |
| 2020/0150575 | A1* | 5/2020 | Yamaki | G03G 15/75 |
| 2024/0419093 | A1* | 12/2024 | Okada | G03G 15/5041 |

FOREIGN PATENT DOCUMENTS

JP 2016-206391 A 12/2016

* cited by examiner

*Primary Examiner* — Carla J Therrien
(74) *Attorney, Agent, or Firm* — Stein IP, LLC

(57) ABSTRACT

The image forming apparatus includes an image carrier, a charging unit, an exposure unit, a developing unit, a transfer unit, a cleaning blade, and a controller. The controller detects printing-coverage rates on a basis of plural areas divided in the longitudinal direction of the image carrier. At a specified timing, the controller executes aging process in which the image carrier in a charged state is driven into rotation under light irradiation by the exposure unit. For the aging process, the controller sets a condition that a light quantity of the exposure unit for an area of larger coverage rate is larger than a light quantity of the exposure unit for an area of smaller coverage rate.

6 Claims, 5 Drawing Sheets

IMAGE FORMING APPARATUS

INCORPORATION BY REFERENCE

This application is based on and claims the benefit of priority from Japanese Patent Application No. 2023-097852 filed on Jun. 14, 2023, the contents of which are hereby incorporated by reference.

BACKGROUND

The present disclosure relates to an image forming apparatus using electrophotographic process and, more particularly, to uniformization of surface potential of an image carrier.

A conventional image forming apparatus of electrophotographic system includes an image carrier (photosensitive member), a charging unit, an LSU, a developing unit, and a fixing unit. Upon input of an instruction for image formation, the cylindrical-shaped image carrier is rotated to make a surface of the image carrier electrically charged by the charging unit. On the charged surface of the image carrier, an electrostatic latent image is formed by exposure of the LSU, and developed into a toner image by the developing unit. The toner image formed on the surface of the image carrier is transferred onto a paper sheet via an intermediate transfer belt, and thereafter an image is fixed on the sheet by the fixing unit. Toner remaining on the image carrier is scraped away by a blade.

SUMMARY

The image forming apparatus of the present disclosure includes an image carrier, a charging unit, an exposure unit, a developing unit, a transfer unit, a cleaning blade, and a controller. The image carrier, having a photosensitive layer on its surface, is driven into rotation, and its surface is electrically charged by the charging unit. The exposure unit exposes to light the charged surface of the image carrier to form an electrostatic latent image, and the developing unit develops the electrostatic latent image into a toner image. The transfer unit transfers the toner image on the image carrier to a recording medium to form an image thereon. The cleaning blade scrapes away toner remaining on the image carrier. The controller detects printing-coverage rates on a basis of plural areas divided in a longitudinal direction of the image carrier. At a specified timing, the controller executes, for a duration of specified aging time, aging process in which the image carrier in its charged state is driven into rotation under light irradiation by the exposure unit. In this process, a light quantity of the exposure unit for an area of larger coverage rate is set larger than a light quantity of the exposure unit for an area of smaller coverage rate.

These and other features of the present disclosure, and specific benefits obtained according to the present disclosure, will become more apparent from the description of an embodiment which follows.

DETAILED DESCRIPTION

Hereinafter, an embodiment of the present disclosure will be described with reference to the accompanying drawings. First mentioned is a problem of conventional image forming apparatuses.

In a conventional image forming apparatus, when its image carrier is formed from positively-charged organic photoconductor, the image carrier would undergo generation of carriers on a photosensitive layer by triboelectrification due to frictional force against a blade. In this case, as a characteristic concerned, the stronger the frictional force is, the more the carriers increase on the photosensitive layer. On the other hand, the frictional force between the image carrier and the blade becomes stronger with increasing toner quantity on the image carrier. For this reason, given differences in lengthwise printing-coverage rate of the image carrier, there arise differences in generated carrier quantity between larger and smaller portions of intervening toner. In this state, electrically charging the image carrier by the charging unit would cause differences in surface potential of the image carrier to be generated in response to generated carrier quantities, leading to appearance of bands and stripes. Thus, there would be a problem that stable images are unobtainable.

Accordingly, in view of the above-described problem, an object of the present disclosure is to provide an image forming apparatus capable of maintaining the surface potential of the image carrier uniform and obtaining stable images.

Figure 1:
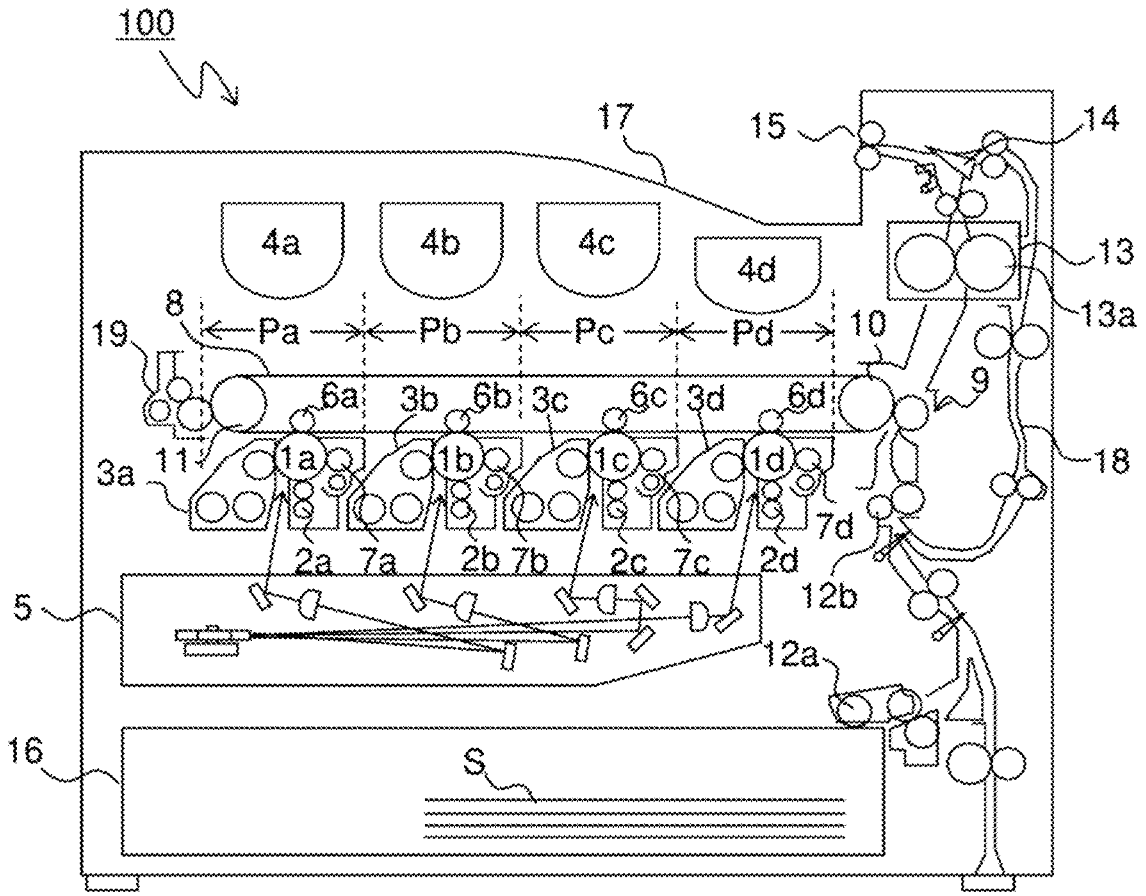
FIG. 1 is a schematic diagram showing an internal configuration of an image forming apparatus according to one embodiment of the present disclosure.
Figure 2:
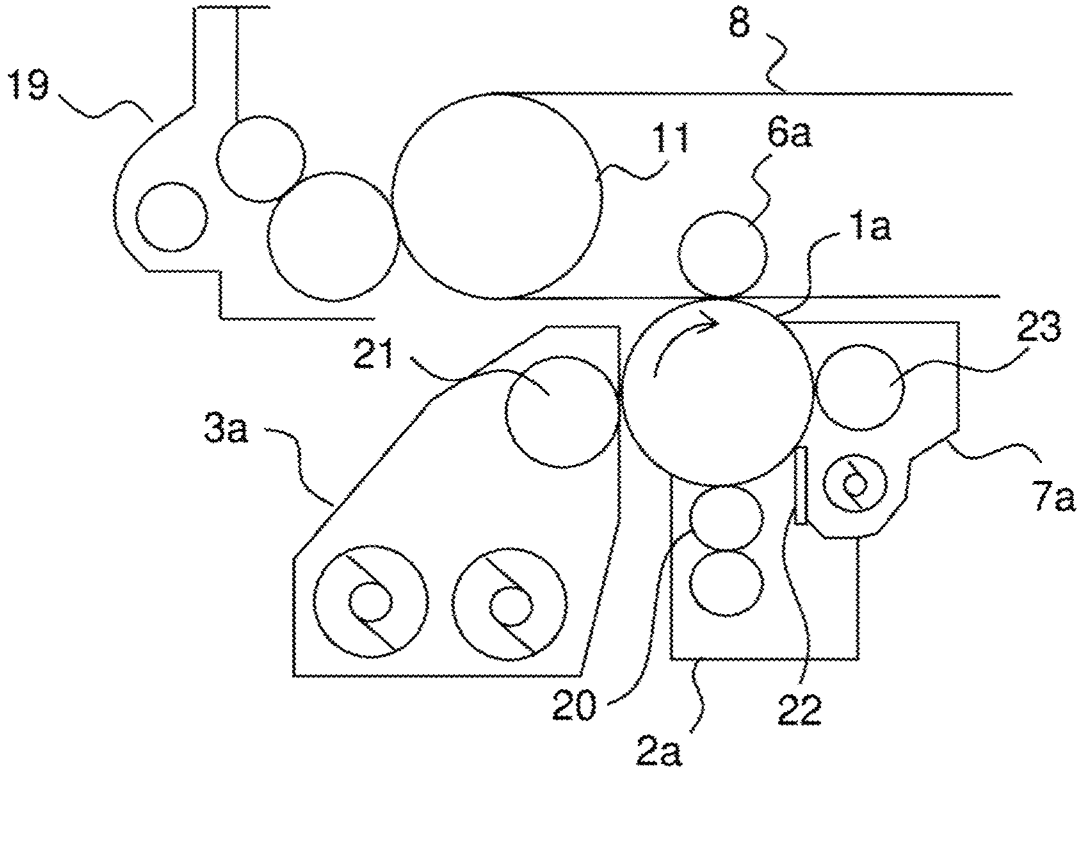
FIG. 2 is an enlarged view of around an image forming part in FIG. 1.

FIG. 1 is a schematic diagram showing a configuration of an image forming apparatus 100 according to one embodiment of the disclosure. FIG. 2 is an enlarged view of around an image forming part Pa in FIG. 1.

The image forming apparatus 100 shown in FIG. 1 is a so-called tandem-type color printer having the following configuration. In a housing of the image forming apparatus 100, four image forming parts Pa, Pb, Pc, Pd are arrayed in this order starting from an upstream side (left side in FIG. 1) of a sheet conveyance direction. These image forming parts Pa to Pd are provided in correspondence to images of different four colors (yellow, cyan, magenta and black), respectively, so as to form images of yellow, cyan, magenta and black sequentially by processes of charging, exposure, development and transfer.

Photosensitive drums 1*a*, 1*b*, 1*c*, 1*d* (image carriers) for carrying individual-color visible images (toner images) are set in those image forming parts Pa to Pd, respectively. The photosensitive drums 1*a* to 1*d*, which are formed from positively-charged mono-layer organic photoconductor, each have a photosensitive layer on their surface. Further in FIG. 1, an intermediate transfer belt 8 that is rotated counterclockwise is provided in adjacency to the image forming parts Pa to Pd. Toner images formed on those photosensitive drums 1*a* to 1*d* are transferred sequentially onto the intermediate transfer belt 8 that moves while keeping in contact with the photosensitive drums 1*a* to 1*d*.

Thereafter, the toner images on the intermediate transfer belt 8 are transferred by a secondary transfer roller 9 onto a paper sheet S which is an example of recording mediums. The sheet S, after having the toner images fixed thereon in the fixing unit 13, is discharged from within the image forming apparatus 100. With the photosensitive drums 1*a* to 1*d* kept rotated clockwise in FIG. 1, image formation process for the photosensitive drums 1*a* to 1*d* is executed.

Sheets S onto which toner images are to be transferred are contained in a sheet cassette 16 set in lower portion of the housing of the image forming apparatus 100. A sheet S is conveyed via a feed roller 12*a* and a registration roller pair 12*b* to the secondary transfer roller 9. A seamless belt is mostly used as the intermediate transfer belt 8.

Next, the image forming parts Pa to Pd will be explained. A detailed description about the image forming part Pa will be given below because the image forming parts Pb to Pd are identical in basic configuration to the image forming part Pa, with description of the image forming parts Pb to Pd omitted. As shown in FIG. 2, a charging unit 2*a*, a developing unit 3*a*, and a cleaning unit 7*a* are disposed around the photosensitive drum 1*a* and along a drum rotational direction (clockwise direction in FIG. 2), while a primary transfer roller 6*a* is placed so as to pinch the intermediate transfer belt 8 against the photosensitive drum 1*a*. Further, a belt cleaning unit 19 is placed on an upstream side of the photosensitive drum 1*a* in the rotational direction of the intermediate transfer belt 8. The belt cleaning unit 19 is opposed to a tension roller 11 with the intermediate transfer belt 8 pinched therebetween.

An exposure unit 5 is placed under the image forming parts Pa to Pd. The exposure unit 5, which is implemented by a laser scanning unit (LSU), includes a light source such as a semiconductor laser, a scanning mirror such as a polygon mirror, and optical components such as lenses. Light beams emitted from the light source scan the photosensitive drums 1*a* to 1*d*, respectively.

Next, image formation procedure in the image forming apparatus 100 is explained. Upon input of a start of image formation by a user, the photosensitive drums 1*a* to 1*d* are driven into rotation by a main motor 61 (see FIG. 3). Surfaces of the rotating photosensitive drums 1*a* to 1*d* are electrically charged uniformly by charging rollers 20 of the charging units 2*a* to 2*d*, respectively. Subsequently, light beams (laser light) emitted from the exposure unit 5 scan and illuminate the surfaces of the photosensitive drums 1*a* to 1*d*. As a result, electrostatic latent images with their charging level attenuated are formed on the photosensitive drums 1*a* to 1*d* in response to image signals, respectively.

Individual-color toner of yellow, cyan, magenta and black is filled to a specified quantity in each of the developing units 3*a* to 3*d*. In addition, when toner rate in two-component developer filled in each of the developing units 3*a* to 3*d* has declined below a predetermined point because of later-described formation of toner images, toner is refilled from toner containers 4*a* to 4*d* into the developing units 3*a* to 3*d*, respectively. This toner in the developer is fed and electrostatically deposited onto the photosensitive drums 1*a* to 1*d* by developing rollers 21 of the developing units 3*a* to 3*d*, respectively. As a result, toner images responsive to the electrostatic latent images formed by exposure of the exposure unit 5 are formed.

Then, by primary transfer rollers 6*a* to 6*d*, electric fields are imparted at a specified transfer voltage between the primary transfer rollers 6*a* to 6*d* and the photosensitive drums 1*a* to 1*d*, respectively. As a result, toner images of yellow, cyan, magenta and black on the photosensitive drums 1*a* to 1*d* are primarily transferred onto the intermediate transfer belt 8. These four-color images are formed with a positional relationship predetermined for the purpose of specified full-color image formation. Thereafter, toner remaining on the surfaces of the photosensitive drums 1*a* to 1*d* is removed by scraping with cleaning blades 22 and scraping rollers 23, respectively. Thus, the photosensitive drums 1*a* to 1*d* can be set ready for subsequent formation of new electrostatic latent images.

As a driving roller 10 is rotated by a belt driving motor 63 (see FIG. 3), the intermediate transfer belt 8 starts to be rotated counterclockwise. The sheet S is conveyed at a specified timing from the registration roller pair 12*b* to the secondary transfer roller 9 provided in adjacency to the intermediate transfer belt 8. A full-color toner image is transferred onto the sheet S by the secondary transfer roller 9. Therefore, the primary transfer rollers 6*a* to 6*d*, the intermediate transfer belt 8, and the secondary transfer roller 9 constitute a transfer unit which transfers toner images on the photosensitive drums 1*a* to 1*d* to a recording medium (sheet S).

The sheet S onto which a toner image has been transferred is conveyed to the fixing unit 13. Toner remaining on the surface of the intermediate transfer belt 8 is removed by the belt cleaning unit 19. The sheet S conveyed to the fixing unit 13 is heated and pressurized by a fixing roller pair 13*a* so that the toner image is fixed on the sheet surface, with a result that a specified full-color image is formed. The sheet S with the full-color image formed thereon is assorted in terms of conveyance direction depending on involvement or not of double-sided printing by a branching unit 14 having branches into plural directions. The sheet S, as it is or after fed to a double-sided conveyance path 18 and subjected to double-sided printing, is discharged onto a discharge tray 17 by a discharge roller pair 15.

Figure 3:
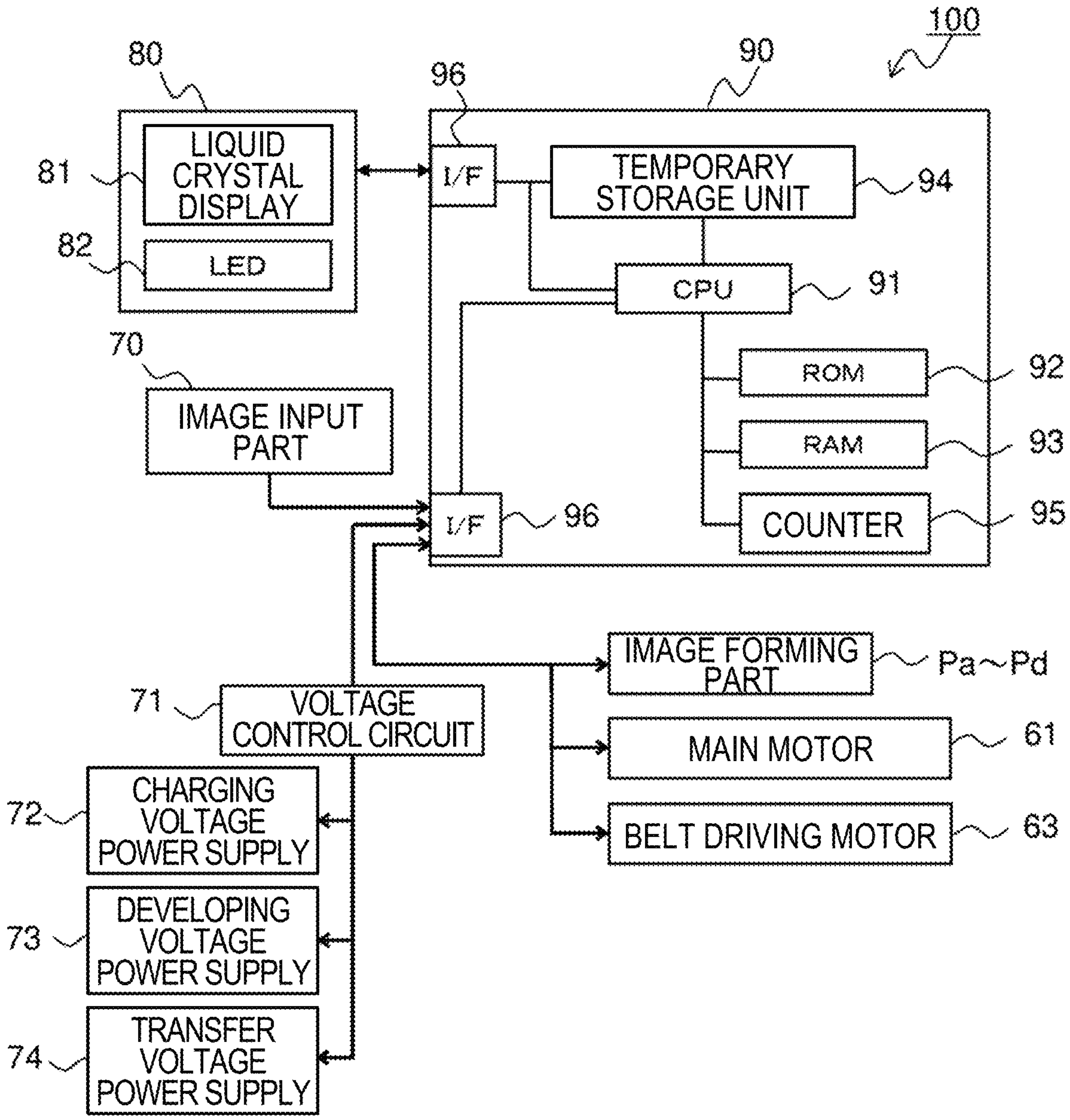
FIG. 3 is a block diagram showing an example of control paths in the image forming apparatus of the embodiment of the present disclosure.

FIG. 3 is a block diagram showing an example of control paths in the image forming apparatus 100 of this embodiment. In addition, since various types of control over individual units are performed for use of the image forming apparatus 100, control paths over the whole image forming apparatus 100 become complicated ones. Therefore, portions of the control paths necessary for embodiment of the present disclosure will be described emphatically.

A controller 90 includes a CPU 91 as a central processing unit, ROM 92 which is a read-only storage unit, RAM 93 which is a readable/writable storage unit, a temporary storage unit 94 for temporarily storing image data or the like, a counter 95, and a plurality (two in this case) of I/F (Interface) units 96 for transmitting control signals to units in the image forming apparatus 100 or for receiving input signals from an operation part 80. In addition, the controller 90 is placeable at an arbitrary place inside the housing of the image forming apparatus 100.

Contained in the ROM 92 are control programs for the image forming apparatus 100 as well as numerical values or the like necessary for control, and data that are invariable during use of the image forming apparatus 100, or the like. Stored in the RAM 93 are necessary data generated in the course of control of the image forming apparatus 100, as well as data temporarily needed for control of the image forming apparatus 100, or the like. The counter 95 cumulates and counts number of printed sheets.

The controller 90 transmits control signals from the CPU 91 through the I/F 96 to individual units of the image forming apparatus 100. Also, signals indicative of individual units' state or input signals are transmitted from the individual units through the I/F 96 to the CPU 91. The individual units to be controlled by the controller 90 include, for example, the image forming parts Pa to Pd, the main motor 61, the belt driving motor 63, an image input part 70, a voltage control circuit 71, the operation part 80, and the like.

The image input part 70 is a reception part for receiving image data transmitted from a personal computer or other device to the image forming apparatus 100. An image signal inputted from the image input part 70 is converted into a digital signal and then sent out to the temporary storage unit 94.

The voltage control circuit 71 is connected to a charging voltage power supply 72, a developing voltage power supply 73 and a transfer voltage power supply 74, and capable of activating these power supplies with output signals derived from the controller 90. By way of a control signal from the voltage control circuit 71, the charging voltage power supply 72 applies a specified charging voltage to the charging rollers 20 within the charging units 2*a* to 2*d*, respectively. By way of a control signal from the voltage control circuit 71, the developing voltage power supply 73 applies a specified developing voltage, in which AC voltage has been superimposed on DC voltage, to the developing rollers 21 within the developing units 3*a* to 3*d*, respectively. By way of a control signal from the voltage control circuit 71, the transfer voltage power supply 74 applies specified transfer voltages to the primary transfer rollers 6*a* to 6*d* and the secondary transfer roller 9, respectively.

A liquid crystal display 81, and an LED 82 indicative of various statuses are provided in the operation part 80. A user operates a stop/clear button of the operation part 80 to stop image formation, and operates a reset button to put various settings of the image forming apparatus 100 to default statuses. The liquid crystal display 81 indicates a status of the image forming apparatus 100, or displays an image-formation status or a number of printed sheets. The various settings are implemented from a personal-computer printer driver.

Figure 4:
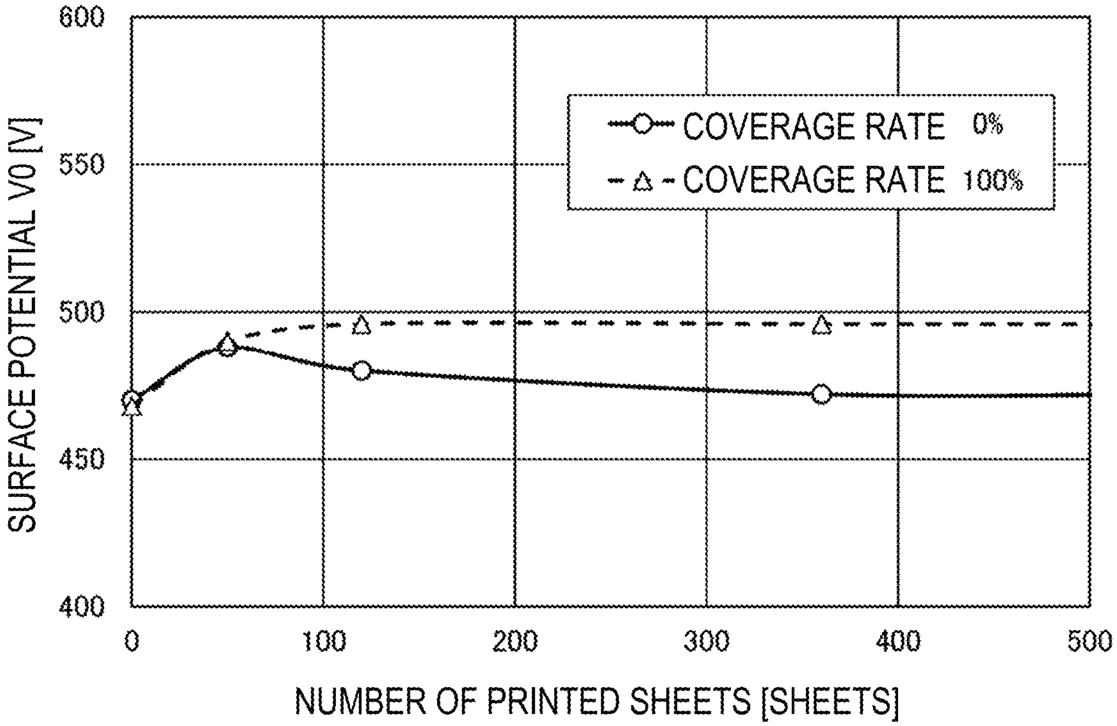
FIG. 4 is a chart showing coverage-rate-based differences in surface potential of a photosensitive drum.

Here is described aging process of the image forming apparatus 100. FIG. 4 is a chart showing variations in surface potential V0 of the photosensitive drums 1*a* to 1*d* versus number of printed sheets in the image forming apparatus. The vertical axis represents surface potential V0 (in unit of V), and the horizontal axis represents number of printed sheets (in unit of sheets). In the figure, solid line represents a case with a coverage rate of 0%, and broken line represents a case with a coverage rate of 100%.

With higher coverage rates, larger quantities of toner tend to intervene between the photosensitive drums 1*a* to 1*d* and the cleaning blades 22, respectively, involving larger frictional force therebetween. Hence, increased carriers result which are generated at the photosensitive layers due to triboelectrification, so that the surface potential V0 of the photosensitive drums 1*a* to 1*d* becomes higher than those in cases of lower coverage rates as shown in FIG. 4. Consequently, involvement of differences in coverage rate in a longitudinal direction (rotational axis direction) of the photosensitive drums 1*a* to 1*d* would cause differences in quantity of generated carriers in the longitudinal direction. In this state, charging the photosensitive drums 1*a* to 1*d* causes differences in surface potential in response to the quantity of generated carriers.

For this reason, the aging process is executed at a specified timing with a view to uniformizing the surface potential of the photosensitive drums 1*a* to 1*d*.

Figure 5:
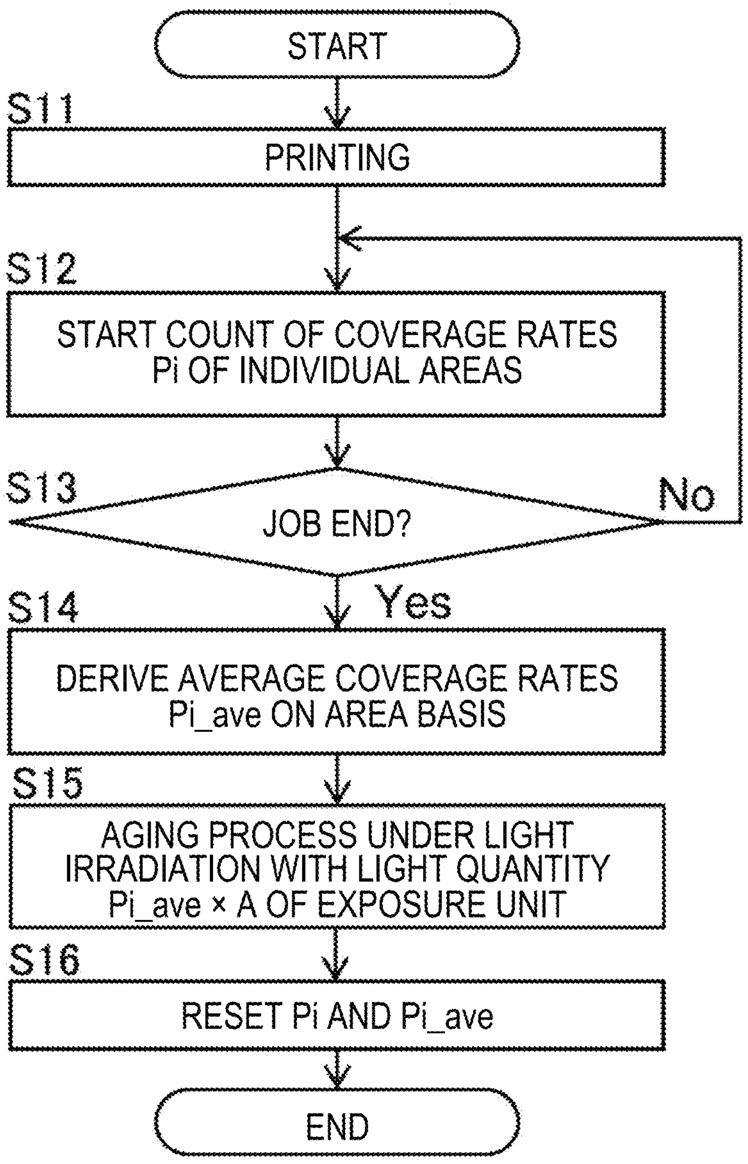
FIG. 5 is a flowchart showing printing operation including aging process in the image forming apparatus according to the embodiment of the present disclosure.

FIG. 5 is a flowchart showing printing operation including the aging process in the image forming apparatus 100. As an instruction for printing is issued from the image input part 70 (see FIG. 3), printing is started at step S11. At step S12, count of coverage rates Pi for individual areas that are previously divided along the longitudinal direction (axial direction) of the photosensitive drums 1*a* to 1*d* is started by the CPU 91. The area-basis coverage rates Pi are stored in the RAM 93 on a print-page basis.

At step S13, it is decided whether or not the print job has been completed. Given no completion of the print job, steps S12 and S13 are repeated; given a completion, processing moves on to step S14. At step S14, average coverage rates Pi_ave (%) resulting from averaging coverage rates Pi of individual printed pages are derived on the area basis by the CPU 91, and stored in the RAM 93.

At step S15, the aging process in which the photosensitive drums 1*a* to 1*d* are driven into rotation in their charged state under light irradiation by the exposure unit 5 is executed for a duration of specified aging time. In this process, light quantity of the exposure unit 5 is varied in response to the average coverage rate Pi_ave. More specifically, a light quantity of the exposure unit 5 is set to a light quantity resulting from multiplying the average coverage rate Pi_ave by a specified constant A. As a result of this, a light quantity of the exposure unit 5 for an area of larger average coverage rate Pi_ave is set larger than a light quantity of the exposure unit 5 for an area of smaller average coverage rate Pi_ave. Upon completion of the aging process, the processing flow moves on to step S16.

At step S16, the coverage rates Pi and the average coverage rates Pi_ave stored in the RAM 93 are reset, where the processing is ended.

As to the image forming apparatus 100 of this embodiment, surface potentials of the photosensitive drums 1*a* to 1*d* after execution of the aging process were checked. With 1,000 sheets of A4-size paper used as test samples, areas D1 and D2 divided in the longitudinal direction of the photosensitive drums 1*a* to 1*d* were subjected to printing at average coverage rates Pi_ave of 0% and 100% respectively.

As test conditions, the test samples, after printing thereon, were subjected to aging process with the areas D1 and D2 irradiated with 0% and 300% (i.e., constant A=3), respectively, of the amount, taken as 100%, of light from the exposure unit 5 during printing. Aging time was 40 sec. Further, as a comparative example, test samples, after printing thereon, were subjected to aging process under the same conditions without light irradiation by the exposure unit 5.

As a consequence, given that aging process was executed under light irradiation, surface potential of the photosensitive drums 1*a* to 1*d* was uniformized, with no occurrence of potential variations. On the other hand, in the comparative example, potential variations occurred to surface potential of the photosensitive drums 1*a* to 1*d*. Thus, with an arrangement that a light quantity of the exposure unit 5 for the area D2 of larger average coverage rate Pi_ave is set larger than a light quantity of the exposure unit 5 for the area D1 of smaller average coverage rate Pi_ave for execution of the aging process, it becomes implementable to maintain surface potential of the photosensitive drums 1*a* to 1*d* uniform.

In addition, for execution of the aging process, area-basis light quantity of the exposure unit 5 is varied in response to the average coverage rate Pi_ave resulting from averaging page-basis coverage rates Pi for each job. However, this is not limitative. It is also allowable that area-basis light quantity of the exposure unit 5 is varied in response to area-basis coverage rates Pi during a specified period including plural pages or plural jobs. That is, for execution of the aging process, a light quantity of the exposure unit 5 for an area of larger coverage rate Pi may be set larger than a light quantity of the exposure unit 5 for an area of smaller coverage rate Pi.

According to this embodiment, for execution of the aging process, a light quantity of the exposure unit 5 for an area of larger coverage rate Pi is set larger than a light quantity of the exposure unit 5 for an area of smaller coverage rate Pi. Therefore, it becomes possible to maintain the surface potential of the photosensitive drums 1*a* to 1*d* (image carriers) uniform and thus obtain stable images.

Also, average coverage rates Pi_ave resulting from averaging coverage rates Pi on the area basis are derived upon a job completion, and for execution of the aging process, a light quantity of the exposure unit 5 for an area of larger average coverage rate Pi_ave is set larger than a light quantity of the exposure unit 5 for an area of smaller average coverage rate Pi_ave. Since the aging process is executed on a basis of average coverage rates Pi_ave derived upon a job completion, it becomes easily implementable to execute the aging process based on differences among coverage rates Pi of plural areas.

Further, a light quantity of the exposure unit 5 in the aging process is set to an average coverage rate Pi_ave×constant A, being proportional to the average coverage rate Pi_ave. As a consequence, it becomes easily implementable to derive a light quantity of the exposure unit 5 variable in response to the average coverage rate Pi_ave.

In addition, although an area-basis light quantity of the exposure unit 5 in the aging process is expressed by a ratio to light quantity of the exposure unit 5 in printing, the light quantity may also be expressed by other means. For example, light quantity of the exposure unit 5 on the area basis may be expressed by output (in unit of W) of the exposure unit 5, laser intensity (in unit of $W/cm^2$), or the like. In these cases, as described above, a light quantity proportional to the average coverage rate Pi_ave can be derived by preliminarily determining the constant A responsive to output or laser intensity.

The present disclosure is not limited to the above-described embodiment and may otherwise be changed and modified in various ways without departing from the gist of the present disclosure. For example, although the aging process is executed depending on a decision whether or not the aging process is executed upon a job completion in the above embodiment, the aging process may also be executed at other timing. For example, the aging process may also be executed depending on a decision, each time a plurality of jobs have been completed, as to whether or not the aging process is executed. The aging process may be executed at a job start on a basis of a preceding-time job.

Without being limited to such tandem-type color printers as shown in FIG. 1, the present disclosure is applicable to various types of image forming apparatuses such as monochromatic printers or monochromatic copiers, digital multifunction peripherals, color copiers or color multifunction peripherals, and so on.

In this disclosure, the aging process is executed under the condition that a light quantity of the exposure unit for an area of larger coverage rate is set larger than a light quantity of the exposure unit for an area of smaller coverage rate. Thus, it becomes implementable to maintain surface potential of the image carriers uniform and therefore obtain stable images.

The present disclosure is applicable to image forming apparatuses using electrophotographic process.

What is claimed is:

1. An image forming apparatus comprising:

an image carrier which has a photosensitive layer on its surface and which is driven into rotation;

a charging unit for electrically charging the surface of the image carrier;

an exposure unit for exposing to light the surface of the image carrier electrically charged by the charging unit to form an electrostatic latent image;

a developing unit for developing the electrostatic latent image into a toner image;

a transfer unit for transferring the toner image to a recording medium;

a cleaning blade for scraping away toner remaining on the image carrier; and a controller, wherein the controller detects coverage rates on a basis of plural areas divided in a longitudinal direction of the image carrier, and at a specified timing, executes aging process in which the image carrier in a charged state is driven into rotation under light irradiation by the exposure unit, where for execution of the aging process, the controller sets a condition that a light quantity of the exposure unit for an area of larger coverage rate is larger than a light quantity of the exposure unit for an area of smaller coverage rate.

2. The image forming apparatus according to claim 1, wherein upon a job completion, the controller derives an average coverage rate resulting from averaging the coverage rates for each area, and sets a condition that a light quantity of the exposure unit for the area of the larger average coverage rate is larger than a light quantity of the exposure unit for the area of the smaller average coverage rate.

3. The image forming apparatus according to claim 2, wherein the image carrier is a positively-charged organic photosensitive member.

4. The image forming apparatus according to claim 1, wherein light quantity of the exposure unit for each area is proportional to the average coverage rate for each area.

5. The image forming apparatus according to claim 4, wherein the image carrier is a positively-charged organic photosensitive member.

6. The image forming apparatus according to claim 1, wherein the image carrier is a positively-charged organic photosensitive member.

* * * * *